United States Patent [19]
Planke et al.

[11] Patent Number: 5,373,933
[45] Date of Patent: Dec. 20, 1994

[54] CONVEYOR WITH VARIABLE SUCTION FORCE

[75] Inventors: Tore Planke, Stranden; Kristian Holmen, Asker, both of Norway

[73] Assignee: Tomra Systems A/S, Asker, Norway

[21] Appl. No.: 149,324

[22] Filed: Nov. 9, 1993

[51] Int. Cl.⁵ .............................................. B65G 17/46
[52] U.S. Cl. ................................................. 198/689.1
[58] Field of Search ...................................... 198/689.1

[56] References Cited

U.S. PATENT DOCUMENTS

| | | | |
|---|---|---|---|
| 3,352,404 | 11/1967 | Settembrini | 198/689.1 X |
| 3,771,647 | 11/1973 | Cumpston, Jr. | 198/689.1 X |
| 3,827,548 | 8/1974 | Matsuo | 198/689.1 |
| 3,889,801 | 6/1975 | Boyer | 198/689.1 |
| 4,294,539 | 10/1981 | Spehrley, Jr. | 198/689.1 X |
| 4,480,742 | 11/1984 | Muylle | 198/689.1 |
| 4,719,721 | 1/1988 | Stump | 198/689.1 X |

FOREIGN PATENT DOCUMENTS

| | | | |
|---|---|---|---|
| 2219775 | 12/1977 | Germany | 198/689.1 |
| 2805271 | 8/1979 | Germany | 198/689.1 |
| 0185616 | 8/1987 | Japan | 198/689.1 |
| 1206206 | 1/1986 | U.S.S.R. | 198/689.1 |

*Primary Examiner*—James R. Bidwell
*Attorney, Agent, or Firm*—Rodman & Rodman

[57] ABSTRACT

A conveyor for lightweight objects, such as plastic beverage containers, includes an upward facing conveyor surface and a drive for causing the conveyor surface to move. An air suction device located below the conveyor surface draws air through the conveyor surface. The drawn air creates an object-stabilizing suction force on an object located on the conveyor surface when the conveyor moves relative to the air suction device. The conveyor has provision for changing the suction force imposed on the object while it is being transported on the conveyor surface.

7 Claims, 3 Drawing Sheets

CONVEYOR WITH VARIABLE SUCTION FORCE

The present invention relates to a conveyor means for light weight objects, such as liquid containers made of plastics, said conveyor means Including a conveyor upward facing surface and means for causing said conveyor surface to move.

In the art it is known that light weight objects, such as empty bottles for beverages are difficult to place on a moving conveyor without tilting or falling. They are also difficult to move, unless the conveyor has a smooth way of operation. More than often, such light weight bottles have a tendency to overturn on the conveyor unless kept on the conveyor by means of supporting rails, arms etc.

Such conveyor means are particularly used in connection with bottle return machines.

It is therefore an object of the present invention to overcome the disadvantages of prior art conveyor means for light weight objects in order to stabilize such objects on the conveyor means when the container is placed on the conveyor by the consumer or during movement of an object from one position to another position along the path of conveyance.

According to the present invention the conveyor means has air suction means located below said conveyor surface and capable of drawing air through said conveyor surface to create an object stabilizing suction force on an object located on said conveyor surface when said conveyor moves relative to said air suction means.

According to a further embodiment of said conveyor means, said air suction means includes a box having walls and a bottom and closed at the top thereof by said conveyor or a perforated or air penetrable top plate member fixed to the top of said walls of said box, and suction fan means having an inlet connected to the inside of said box and an outlet connected to the atmosphere.

According to another embodiment of the conveyor means, said conveyor is a rotatable disk or an endless belt.

Suitably, the conveyor surface could be made of a material having an inherent air penetrability or be made of a perforated material or wire mesh.

Preferred, but non-limitative embodiments of the invention are now to be described with reference to the enclosed drawings.

Light weight objects such as empty bottles 1 made of plastics are difficult to move by means of a conveyor because they are inclined to overturn unless the conveyor has an absolutely smooth operation or the bottle is stabilized by guide rails or arms. Such bottles are either of non-returnable (one-way) type or refillable. The typical bottles for beverages have either a convex bottom which is fitted into a base cup or the bottle may have so-called champagne bottom, i.e. concave bottom.

The present invention is of particular importance when used together with a machine for receiving empty liquid containers, such as bottles made of plastics, at e.g. a supermarket. However, the utilisation of the present invention is not limited to the use with such machines.

Figure 1:
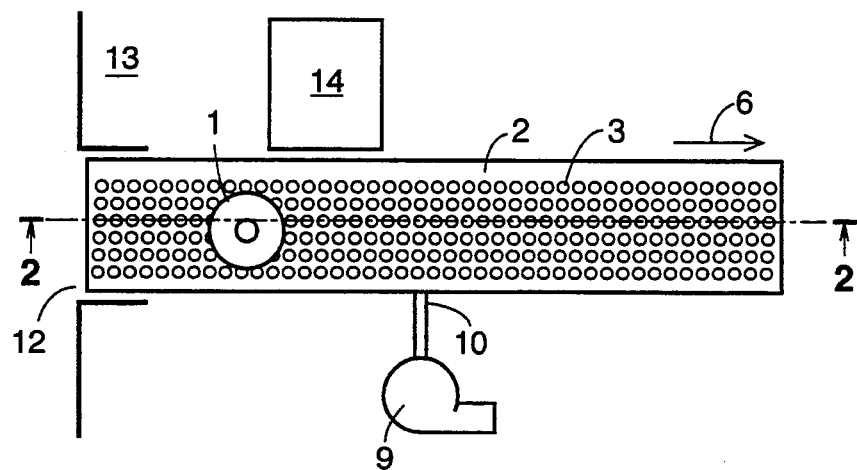
FIG. 1 is a simplified top view of a first embodiment of the conveyor means, according to the invention.

In FIG. 1, said bottle 1 is located on a conveyor belt 2, said conveyor belt 2 being air permeable by means of holes 3 or other air communicating openings in said conveyor belt. The conveyor belt 2 is caused to move by means of a motor 4 coacting with end roller means 5 at least at one end of said conveyor 2. Said conveyor belt 2 is, as seen in FIG. 2 made as an endless belt 2.

Said air conveying openings or holes in said endless belt 2 could be made through perforation of the belt to create holes therein or the conveyor could be made of a material having an inherent air penetrability, such as e.g. a wire mesh or a suitable type of fabric. As seen in FIGS. 1 and 2, the conveyor moves in the direction of the arrow labelled 6.

Figure 2:
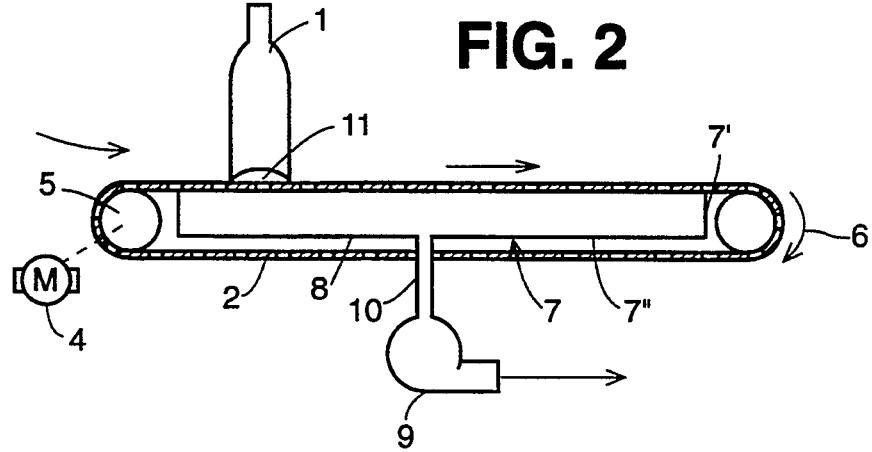
FIG. 2 shows section II—II in FIG. 1.

In order to provide a stabilizing force acting on the bottle or liquid container made of plastics when located on the conveyor upper facing surface, as seen in FIG. 1 and 2, air suction means 7 is located below the conveyor surface and is capable of drawing air through said conveyor surface to create an object stabilizing suction force on the object or bottle located on the conveyor surface when the conveyor is caused to move relative to the air suction means 7. The air suction means 7 includes a box having walls 7' and a bottom 7'', said box being closed at the top thereof by said conveyor 2, thus creating a box cavity 8 below the conveyor upward facing surface. In order to cause withdrawal of air through said conveyor surface, a suction fan means 9 is provided, said suction fan means 9 communicating with said cavity 8 through an air flow pipe 10.

Thus, it will be appreciated that a suction force is created between the upward facing surface of the conveyor 2 and the bottom of the liquid container or bottle 1 at a region 11, as clearly seen from FIG. 2.

Thus, when a customer delivers a bottle or liquid container at an inlet 12 of a machine 18 for receiving and handling such empty liquid containers or bottles, the bottle is sucked to the upward facing surface of the conveyor 2, and when the bottle or liquid container 1 is moved past a bottle feature detecting station 14 it will be in a stabilized state on the conveyor, thus enabling a more reliable detection of the bottle or liquid container 1 as it passes the detector station 14. Further, the suction force acting at the region 11 will cause the bottle or liquid container to be in a stabilized state along almost the full length of the conveyor, thus avoiding the possibility that the bottle or liquid container 1 overturns and causes jamming or other subsequent bottles or liquid containers to overturn due to a "Domino-effect" or causes further handling of the bottle or container to be discontinued until the operational disturbance has been manually corrected.

A further embodiment of the present invention is to be explained with reference to drawing FIGS. 3 and 4.

Instead of the conveyor belt 2 in FIGS. 1 and 2, there is provided a rotatable conveyor disk 15. The disk 15 is driven by motor means 4. As explained in connection with FIG. 1 and 2, the conveyor means disclosed in FIGS. 3 and 4 could suitably be used in operation with a machine 16 for receiving empty liquid containers or bottles made of plastics, such machine suitably being installed at a supermarket or other proper location. Such machine will, like the embodiment in FIG. 1 and 2 have a detector station 14 for detecting characteristic features of said bottle or liquid container. Said bottle or liquid container is delivered by a customer at an inlet indicated by reference numeral 17. Suitably the bottle or liquid container 1 is conveyed by the disk 15 over a semi-circular path to be discharged at an outlet 18.

At the inlet 17, there is suitably arranged an inlet wall 19 located slightly above the conveyor 15 in order to enable the customer to properly locate the bottle or liquid container 1 on the conveyor upward facing surface.

At the outlet 18, a guide wall 20 and possibly a further guide wall 21 are located to cause the bottle or liquid container 1 to be forcibly moved off the conveyor disk 15 and thereby disengaging from the suction force acting at said region 11 between said bottom of the bottle 1 and the upward facing surface of the conveyor 15. In order to create said suction force, there is located below said conveyor upward facing surface air suction means 22 being capable of drawing air through said conveyor surface to create an object stabilizing suction force on the object located on the conveyor surface when the conveyor moves relative to the air suction means 22. Said suction force is, as mentioned, created at region 11 between the bottom of the liquid container or bottle 1 and the upward facing surface of the conveyor 15, as indicated in FIG. 4.

Figure 4:
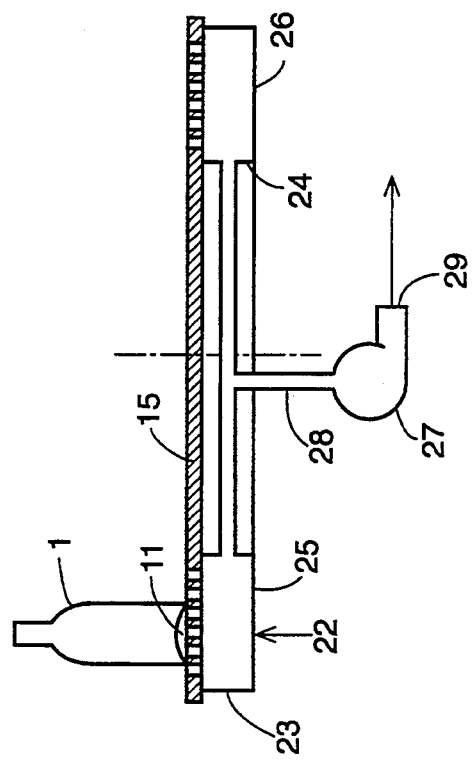
FIG. 4 is cross section IV—IV in FIG. 3.
Figure 3:
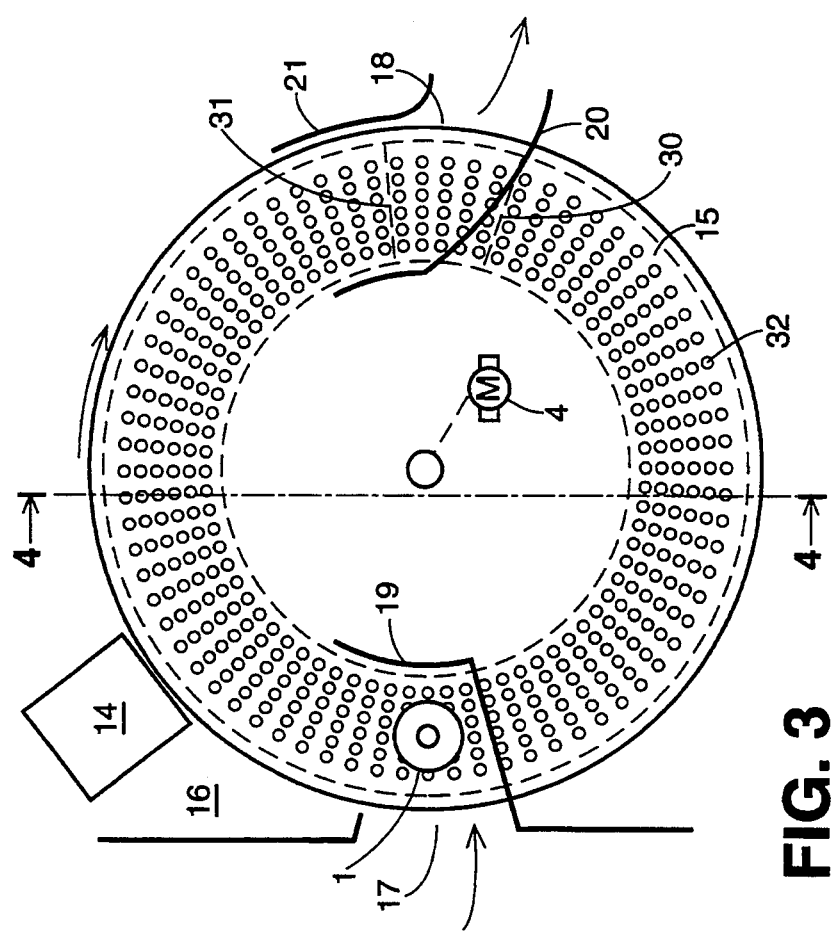
FIG. 3 is a top view of a second embodiment of the conveyor means, according to the invention.

In the embodiment as shown in FIGS. 3 and 4 the air suction means is substantially formed as a ring shaped body, said body being made as a box having an outer wall 23, an inner wall 24, and a bottom 25. Thus, a cavity 26 is created because the box is closed at the top thereof by means of said conveyor disk 15.

In order to create a suction force at said region 11, a suction fan means 27 is installed having an inlet 28 connected to the inside 25 or cavity of said box and an outlet 29 connected to the atmosphere.

Thus, when the suction fan means 27 is operative, air will be drawn through the conveyor disk 15 into the cavity 26, through the suction fan means 27 to the outlet 29 of said suction fan means.

As indicated in FIG. 3, said box 22 could at the top thereof between the border lines 30 and 31 be closed by an air tight plate or a plate having a small air leakage therethrough in order to remove or reduce the suction force acting at region 11 between the bottom of the bottle or liquid container 1 and the upward facing surface of the conveyor disk 15 when the bottle or container is about to leave the disk 15 at the outlet 18.

As seen in FIG. 3 and 4, the disk 15 has a ring shaped area provided with holes or openings 32 through which air can penetrate. In a particular embodiment, the material of the conveyor surface could have an inherent air penetrability or it could be made of a perforated material, a wire mesh or any technically equivalent material.

Figure 5:
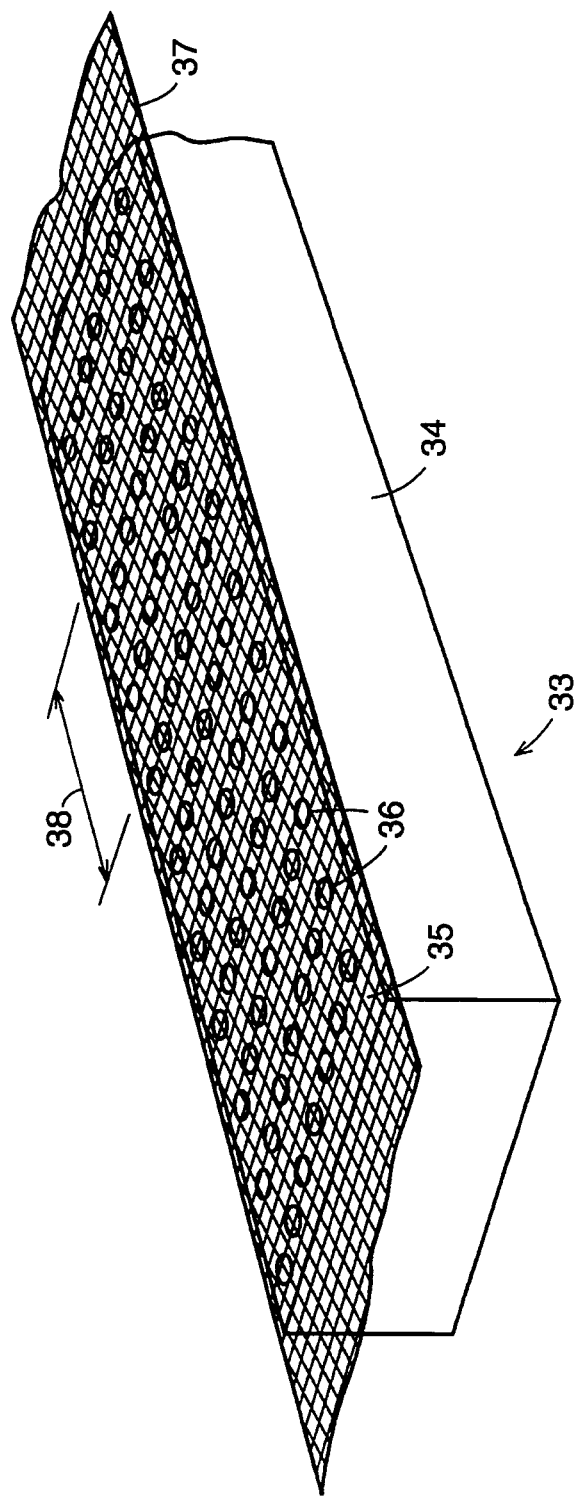
FIG. 5 shows a modification of the arrangement shown in FIGS. 1–4.

As an alternative to that which has been shown and described in connection with FIGS. 1–4, the said box 8 (FIG. 2) or 22 (FIG. 4) could be replaced by a box of a type as shown in FIG. 5. The box shown in FIG. 5 is labelled 33 and has walls 34, a bottom (not shown) and a top plate member 35 fixedly attached to the top of said walls 34, said top plate member 35 having a plurality of holes 36 distributed over the surface thereof or any other type of perforation. The conveyor is in FIG. 5 denoted by reference numeral 37. The technique described in connection with FIG. 5 is particularly directed to the conveyor 37 being an endless belt. However, it will be appreciated that the technique may equally be applied to the rotatable disk solution presented in FIGS. 3 and 4 by proper modification of the teachings of FIG. 5.

In FIG. 5 the conveyor belt 37 could be of a material having inherent air penetrability or be a perforated material, e.g. a wire mesh or a suitable fabric.

As indicated also for FIG. 3, parts of the top plate member 35 could have a lesser number of perforations or the like per unit area than for the remainder of the top plate member 35.

Such area of reduced air flow-through per unit area could be over the range of the conveyor labelled 38 in FIG. 5. This is shown merely to illustrate the principle of such reduced air flow area, rather than limiting the invention to the specific example of FIG. 5.

By removing or gradually reducing the number of perforations 36 per unit area of the top plate member 35, the object stabilizing suction force will to a variable degree be reduced in order to more easily remove the object off the conveyor.

Having described our invention, we claim:

1. A reverse vending machine conveyor for lightweight objects including empty plastic beverage containers comprising, a conveyor member having an upward facing conveyor surface, means for causing movement of said conveyor member, air suction means located below the upward facing conveyor surface for drawing air through said upward facing conveyor surface to create an object stabilizing suction force on an object placed on said upward facing conveyor surface, said suction force stabilizing said object when said conveyor member moves relative to said air suction means, said air suction means including a box having walls and a bottom, an air penetrable top plate member fixed to said walls to close the top of said box, suction fan means having an inlet communicating with the inside of said box and an outlet communicating with ambient space, and said top plate member being provided with a first plurality of perforations per unit area over a first predetermined distance along the direction of movement of said conveyor member, and a second plurality of perforations per unit area over a second predetermined distance along the direction of movement of said conveyor member, said second plurality of perforations per unit area providing less suction area than said first plurality of perforations per unit area.

2. A reverse vending machine conveyor according to claim 1 wherein said conveyor member is a rotatable disc.

3. A reverse vending machine conveyor according to claim 1 wherein said conveyor member is an endless belt.

4. A reverse vending machine conveyor according to claim 1 wherein said conveyor member is made of a material that is inherently air penetrable.

5. A reverse vending machine conveyor according to claim 1 wherein said conveyor member is formed of a perforated material.

6. A reverse vending machine conveyor according to claim 1 wherein said conveyor member is formed of wire mesh.

7. A reverse vending machine conveyor according to claim 1 wherein said perforations are of circular shape.

* * * * *

UNITED STATES PATENT AND TRADEMARK OFFICE
CERTIFICATE OF CORRECTION

PATENT NO. : 5,373,933
DATED : December 20, 1994
INVENTOR(S) : Tore Planke, et al.

It is certified that error appears in the above-identified patent and that said Letters Patent is hereby corrected as shown below:

In Column 3, line 34 , change "25" to --26--.

Signed and Sealed this

Eleventh Day of April, 1995

Attest:

BRUCE LEHMAN

*Attesting Officer*    *Commissioner of Patents and Trademarks*